United States Patent
Nagahashi et al.

(10) Patent No.: US 6,409,244 B1
(45) Date of Patent: Jun. 25, 2002

(54) AUTOMOTIVE WINDOW MOLDING

(75) Inventors: Yuuji Nagahashi, Chiba; Akira Hoshikawa, Gunma; Takeshi Arai, Gunma; Yukio Furugori, Gunma, all of (JP)

(73) Assignees: Kinugawa Rubber Ind., Co., Ltd., Chiba; Fuji Jukogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/738,861

(22) Filed: Dec. 18, 2000

(30) Foreign Application Priority Data

Dec. 20, 1999 (JP) .......................................... 11-360505

(51) Int. Cl.[7] ................................................ B60J 10/02
(52) U.S. Cl. ...................... 296/93; 296/208; 52/204.597
(58) Field of Search ..................... 296/93, 208; 52/208, 52/204.591, 204.597

(56) References Cited

U.S. PATENT DOCUMENTS

| | | | | |
|---|---|---|---|---|
| 5,133,537 A | * | 7/1992 | Shirahata et al. | 296/93 |
| 5,154,471 A | * | 10/1992 | Mimura et al. | 296/93 |
| 5,171,051 A | * | 12/1992 | Yada | 296/93 |
| 5,176,420 A | * | 1/1993 | Kato | 296/93 |
| 5,344,205 A | * | 9/1994 | Yada et al. | 296/208 X |
| 5,389,423 A | * | 2/1995 | Yada | 296/93 X |
| 5,456,049 A | * | 10/1995 | Goto et al. | 296/93 X |
| 5,492,387 A | * | 2/1996 | Yada et al. | 296/93 |
| 5,561,954 A | * | 10/1996 | Watanabe et al. | 296/208 X |
| 5,607,197 A | * | 3/1997 | Yada | 296/208 X |
| 5,752,352 A | * | 5/1998 | Goto et al. | 296/208 X |
| 5,927,040 A | * | 7/1999 | Kuwabara | 296/93 X |
| 6,030,020 A | * | 2/2000 | Malm | 296/93 |
| 6,106,047 A | * | 8/2000 | Nagahashi et al. | 296/93 |
| 6,231,117 B1 | * | 5/2001 | Nagashi | 296/93 X |
| 6,238,769 B1 | * | 5/2001 | Nashio et al. | 296/93 X |

FOREIGN PATENT DOCUMENTS

JP 4-365621 12/1992

* cited by examiner

*Primary Examiner*—Joseph D. Pape
(74) *Attorney, Agent, or Firm*—Foley & Lardner

(57) ABSTRACT

An automotive window molding attached onto a circumference of a window glass and arranged at a pillar side of a vehicle body, includes an outside glass abutting portion being in contact with an outside surface of the window glass, an outside ornamental head portion arranged outside of the outside glass abutting portion and spaced apart from the outside glass abutting portion so that the outside ornamental head portion and the outside glass abutting portion are opposed to each other, and a connecting wall portion interconnecting the outside ornamental head portion and the outside glass abutting portion. A drip groove is defined by the outside glass abutting portion, the outside ornamental head portion, and the connecting wall portion, so that the drip groove is opened toward inside of the perimeter of the window glass. In order to allow snow to impinge and break on a tip of the outside glass abutting portion by wiping action of a wiper blade during vehicle driving in the snow, a tip portion of the outside glass abutting portion is configured to protrude toward inside of the perimeter of the window glass more than a tip portion of the outside ornamental head portion protrudes toward inside of the perimeter of the window glass.

6 Claims, 3 Drawing Sheets

AUTOMOTIVE WINDOW MOLDING

TECHNICAL FIELD

The present invention relates to an automotive window molding attached onto the circumference of an automotive window glass so as to fill up a gap or an aperture between the circumference of the window glass and a vehicle body, and particularly to such an automotive window molding formed with a drip groove or a drain groove for enhanced drainage performance.

BACKGROUND ART

Generally, a window molding is attached around the circumference of an automotive window glass, to provide a tight seal between the circumference of the window glass and the vehicle body and thus to prevent the ingress of moisture, and also to enhance ornamental design. In recent years, such a window molding with a drip groove (a drain groove) or a rainwater receiving groove is often formed at its pillar side (for example, both side molding portions of a windshield molding) in order to effectively drain rainwater. On such wind molding with a drip groove has been disclosed in Japanese Patent Provisional Publication No. 4-365621. The aforementioned drip groove faces toward the center of the outside surface of the window glass and is opened toward within the perimeter of the window glass. During vehicle driving in a rainy day, the drip groove functions to receive rainwater dripping on the window glass, and thus to drain downwards from the pillar. In order to effectively drain rainwater, such a drip groove is usually formed in a side molding portion of the window molding. However, during vehicle driving in the snow, snow is pressed against the side molding portion by wiping action of the windshield wiper, and thus snow enters the drip groove. As a result of this, snow would be pressed together and strongly adhered to the side molding portion. The conventional window molding as discussed above is insufficient from the viewpoint of good snow-removing performance. Also, a window molding having a drip groove or a drain groove tends to increase aerodynamic noise such as atmospheric wind flow noise around the window molding.

SUMMARY OF THE INVENTION

Accordingly, it is an object of the invention to provide an automotive window molding with a drain groove or a drip groove, which avoids the aforementioned disadvantages.

It is another object of the invention to provide an automotive window molding with a drain groove or a drip groove, which is capable of ensuring enhanced snow-removing performance as well as superior rainwater drainage performance, and of ensuring reduced aerodynamic noise.

In order to accomplish the aforementioned and other objects of the present invention, an automotive window molding attached onto a circumference of a window glass and arranged at a pillar side of a vehicle body, comprises an outside glass abutting portion being in contact with an outside surface of the window glass, an outside ornamental head portion arranged outside of the outside glass abutting portion and spaced apart from the outside glass abutting portion so that the outside ornamental head portion and the outside glass abutting portion are opposed to each other, a connecting wall portion interconnecting the outside ornamental head portion and the outside glass abutting portion, and a drip groove defined by the outside glass abutting portion, the outside ornamental head portion, and the connecting wall portion, so that the drip groove is opened toward inside of a perimeter of the window glass, wherein a tip portion of the outside glass abutting portion is configured to protrude toward inside of the perimeter of the window glass more than a tip portion of the outside ornamental head portion protrudes toward inside of the perimeter of the window glass. It is preferable that the automotive window molding may further comprise a drain groove which is opened toward outside of the vehicle body, and a protruded portion formed at a bottom of the drain groove. More preferably, the automotive window molding may further comprise a protruded portion formed on an edge of the outside ornamental head portion facing a vehicle-body panel and located outside of the perimeter of the window glass, and the protruded portion extending from the edge of the outside ornamental head portion toward outside of the perimeter of the window glass.

According to another aspect of the invention, an automotive window molding attached onto a circumference of a window glass and arranged at a pillar side of a vehicle body, comprises a leg portion disposed between the circumference of the window glass and a vehicle-body panel, an outside glass abutting portion being in contact with an outside surface of the window glass and arranged along the outside surface of the window glass to extend toward inside of a perimeter of the window glass, an inside glass abutting portion being in contact with an inside surface of the window glass and arranged along the inside surface of the window glass to extend toward inside of the perimeter of the window glass, a seal lip portion extending from an outer surface of the leg portion facing the vehicle-body panel and abutting at a tip thereof with the vehicle-body panel while being curved toward outside of the vehicle body, an outside ornamental head portion arranged outside of the outside glass abutting portion and spaced apart from the outside glass abutting portion so that the outside ornamental head portion and the outside glass abutting portion are opposed to each other, a connecting wall portion interconnecting the outside ornamental head portion and the outside glass abutting portion, and a drip groove defined by the outside glass abutting portion, the outside ornamental head portion, and the connecting wall portion, so that the drip groove is opened toward an inside of the perimeter of the window glass, wherein a tip portion of the outside glass abutting portion is configured to protrude toward an inside of the perimeter of the window glass more than a tip portion of the outside ornamental head portion protrudes toward an inside of the perimeter of the window glass.

According to a further aspect of the invention, an automotive window molding attached around a circumference of a windshield glass and having at least a side molding portion formed by extrusion molding and arranged at a pillar side of a vehicle body, comprises a leg portion disposed between the circumference of the windshield glass and a front pillar of the vehicle body, an outside glass abutting portion being in contact with an outside surface of the windshield glass and arranged along the outside surface of the windshield glass to extend toward an inside of a perimeter of the windshield glass, an inside glass abutting portion being in contact with an inside surface of the windshield glass and arranged along the inside surface of the windshield glass to extend toward an inside of the perimeter of the windshield glass, a seal lip portion extending from an outer surface of the leg portion facing the front pillar and abutting at a tip thereof with the front pillar while being curved toward outside of the vehicle body, an outside ornamental head portion arranged outside of the outside glass abutting portion and spaced apart from the outside glass abutting portion so that the outside ornamental head portion and the outside glass abutting portion are opposed to each other, a connecting wall portion interconnecting the outside ornamental head portion and the outside glass abutting portion, the connecting wall portion, the outside ornamental head portion, and the outside glass abutting portion being integrally formed with each other, and a drip groove defined by the outside glass abutting portion, the outside ornamental head portion, and the connecting wall portion, so that the drip groove is opened toward inside of the perimeter of the windshield glass, wherein a tip portion of the outside glass abutting portion is configured to protrude toward inside of the perimeter of the windshield glass more than a tip portion of the outside ornamental head portion protrudes toward an inside of the perimeter of the windshield glass.

The other objects and features of this invention will become understood from the following description with reference to the accompanying drawings.

DESCRIPTION OF THE PREFERRED EMBODIMENTS

Figure 1:
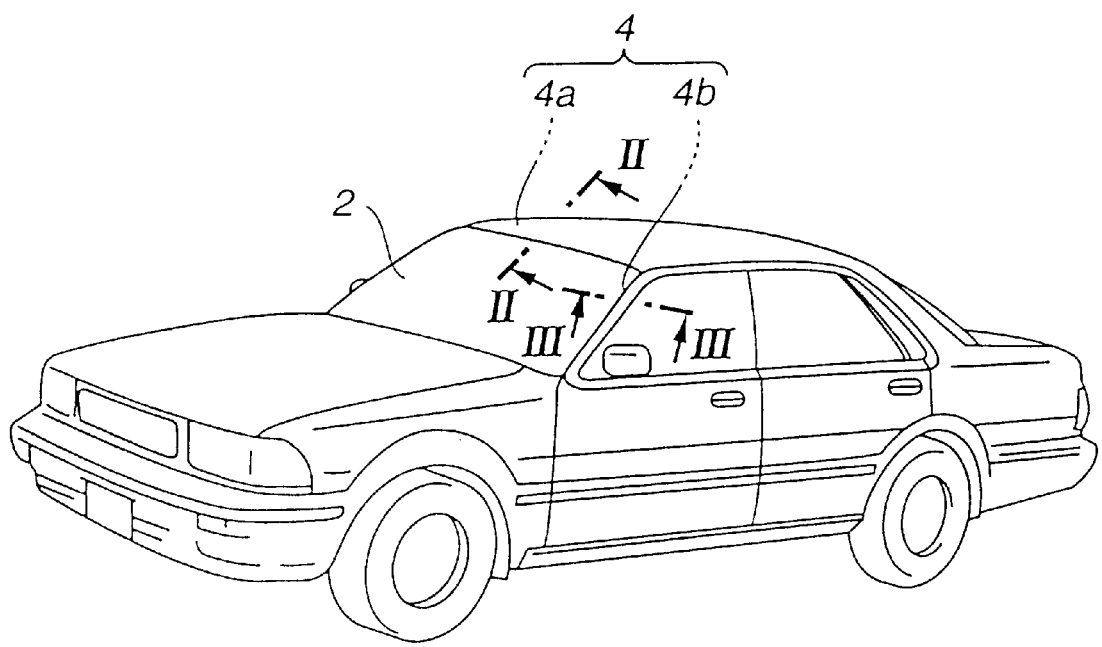
FIG. 1 is a perspective view illustrating an automotive vehicle.

Referring now to the drawings, particularly to FIG. 1, a window molding 4, which is made of synthetic resin, is installed on to and attached around the circumference of an automotive windshield glass (an automotive front window glass) 2. The window molding 4 is comprised of an upper molding portion 4a located along the upper edge of the windshield glass 2 in the vehicle-body roof's side and a pair of side molding portions (4b, 4b) located along both side edges of the windshield glass 2 in the vehicle-body front pillars' side. The front-right side molding portion 4b, the upper molding portion 4a, and the front-left side molding portion 4b are continuous with each other and integrally formed with each other by way of extrusion molding.

Figure 2:
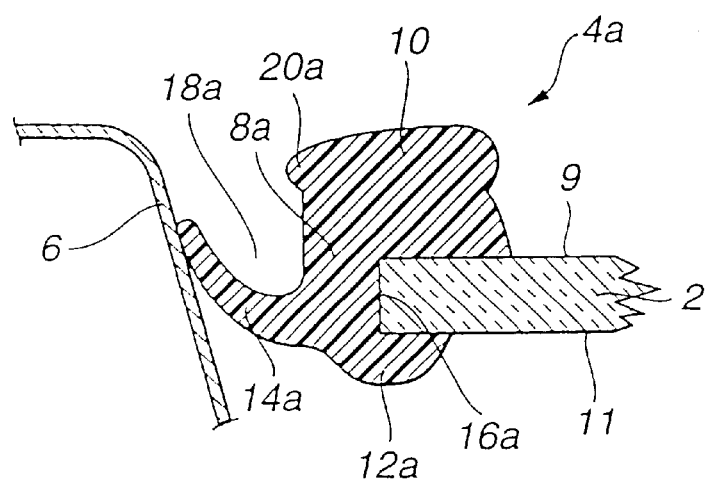
FIG. 2 is a lateral cross-sectional view taken along the line II—II of FIG. 1, and showing the upper molding portion of an automotive window molding of the invention.

As can be seen from the lateral cross section shown in FIG. 2, the upper molding portion 4a is comprised of a leg portion 8a, an outside head portion 10, an inside glass abutting portion 12a, and a seal lip portion 12a. The leg portion 8a is disposed between the circumference of the windshield glass 2 and a vehicle-body panel (exactly, an outer roof rail) 6. As viewed from the cross section of FIG. 2, the outside head portion 10 is located on the upper edged portion of an end of windshield glass 2, and arranged along the outside surface 9 of windshield glass 2 in such a manner as to extend from the upper edged portion toward the inside of the perimeter of windshield glass 2, that is, rightwards (viewing FIG. 2). On the other hand, the inside glass abutting portion 12a is located on the lower edge portion of the leftmost end of windshield glass 2, and arranged along the inside surface 11 of windshield glass 2 in such a manner as to extend from the lower edged portion toward the inside of the perimeter of windshield glass 2, that is, rightwards (viewing FIG. 2). The seal lip portion 14a extends from the outer surface of leg portion 8a facing the vehicle-body panel 6 so that the seal lip portion 14a abuts at its tip end with the vehicle-body panel 6 while being slightly curved toward the outside of the vehicle body. The upper molding portion 4a is formed with a fit groove 16a which is defined between the outside head portion 10 and the inside glass abutting portion 12a. The circumference of windshield glass 2 is fitted into the fit groove 16a of upper molding portion 4a so as to attach the upper molding portion 4a onto the circumference of windshield glass 2. A drain groove 18a is formed between the leg portion 8a and the vehicle-body panel 6 by way of abutment of the seal lip portion 14a with the outer surface of the vehicle-body panel 6 in an outwardly-curved fashion, such that the drain groove 18a is opened toward outside of the vehicle. In addition, the outside head portion 10 is formed on its upper edge facing the vehicle-body panel 6 with a protruded portion 20a. The protruded portion 20a protrudes from the upper edge facing the vehicle-body panel and located outside of the perimeter of the windshield glass 2 so that the protruded portion 20a somewhat projects within the opening of the drain groove 18a. The protruded portion 20a is continuously formed throughout the overall length of upper molding portion 4a.

Figure 3:
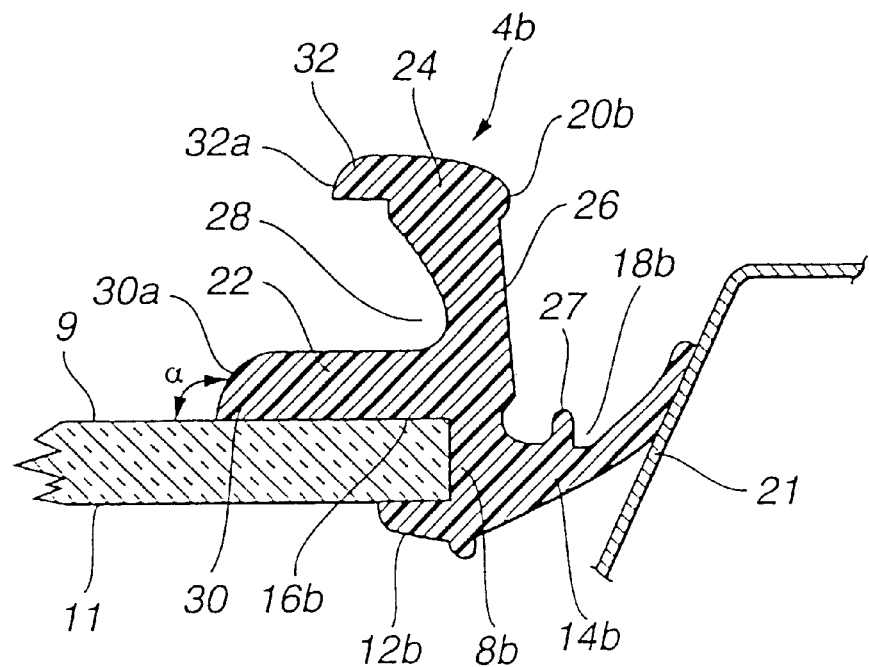
FIG. 3 is a lateral cross-sectional view taken along the line III—III of FIG. 1, and showing the side molding portion of the automotive window molding of the invention.

Referring now to FIG. 3, there is shown the lateral cross section of the side molding portion 4b of window molding 4. The sectional structure of the side molding portion 4b is similar to that of the upper molding portion 4a, but somewhat different from the latter, as discussed hereunder in detail. The side molding portion 4b is comprised of a leg portion 8b, an outside glass abutting portion 22, an inside glass abutting portion 12b, a seal lip portion 14b, an outside ornamental head portion 24, and a connecting wall portion 26. The leg portion 8b is disposed between the circumference of the windshield glass 2 and the vehicle-body panel (exactly, a vehicle-body front pillar, often called "A pillar") 21. As viewed from the cross section of FIG. 3, the outside glass abutting portion 22 is located on the upper edged portion of the rightmost end of windshield glass 2, and arranged along the outside surface of windshield glass 2 in such a manner as to be in contact with the outside surface 9 of windshield glass 2 and to extend from the upper edged portion toward inside of the perimeter of windshield glass 2, that is, leftwards (viewing FIG. 3). On the other hand, the inside glass abutting portion 12b is located on the lower edged portion of the rightmost end of windshield glass 2, and arranged along the inside surface 11 of windshield glass 2 in such a manner as to extend from the lower edged portion toward the inside of the perimeter of windshield 2, that is, leftwards (viewing FIG. 3). The inside glass abutting portion 12b of the side molding portion 4b is formed to be continuous with the inside glass abutting portion 12a of the upper molding portion 4a. The seal lip portion 14b extends from the outer surface of leg portion 8b facing the vehicle-body panel 21 so that the seal lip portion 14b abuts at its tip end with the vehicle-body panel 21 while being slightly curved toward the outside of the vehicle. The outside ornamental head portion 24 is arranged outside of the outside glass abutting portion 22 so that the outside ornamental head portion 24 is slightly spaced apart from the outside glass abutting portion 22 and that these portions 22 and 24 are opposed to each other. The connecting wall portion 26 interconnects the outside glass abutting portion 22 and the outside ornamental head portion 24. As described previously, the front-left side molding portion 4b, the upper molding portion 4a and the front-right side molding portion 4b are integrally formed with each other by way of extrusion molding. Therefore, the leg portion 8b of side molding portion 4b is continuous with the leg portion 8a of upper molding portion 4a, while the seal lip portion 14b of side molding portion 4b is continuous with the seal lip portion 14a of upper molding portion 4a. Additionally, ornamental head portion 24, connecting wall portion 26, and outside glass abutting portion 22, all included in the side molding portion 4b, are continuous with the head portion 10 of upper molding portion 4a. In the same manner as the upper molding portion 4a, the side molding portion 4b is also formed with a fit groove 16b which is defined between the outside glass abutting portion 22 and the inside glass abutting portion 12b. The circumference of windshield glass 2 is fitted into the fit groove 16b of side molding portion 4b so as to attach the side molding portion 4b onto the circumference of windshield glass 2. A drain groove 18b is formed between the leg portion 8b and the vehicle-body panel 21 by way of abutment of the seal lip portion 14b with the outer surface of the vehicle-body panel 21 in an outwardly-curved fashion, such that the drain groove 18b is opened toward the outside of the vehicle body. A protruded portion 27 is continuously formed at the bottom of the drain groove 18b throughout the overall length of side molding portion 4b, so that the protruded portion 27 protrudes from the bottom of the drain groove 18b toward the opening of the drain groove 18b. As appreciated, the fit groove 16b of side molding portion 4b is continuous with the fit groove 16a of upper molding portion 4a, while the drain groove 18b of side molding portion 4b is continuous with the drain groove 18a of upper molding portion 4a. In addition to the above, the side molding portion 4b is further formed with a drip groove 28 which is defined by the outside glass abutting portion 22, the ornamental head portion 24 and the connecting wall portion 26. The drip groove 28 is opened toward the inside of the perimeter of windshield glass 2. Note that, in the automotive window molding of the embodiment, a tip portion 30 of the outside glass abutting portion 22 is formed or configured to protrude toward the inside of the perimeter of windshield glass 2 more than a tip portion 32 of the outside ornamental head portion 24 protrudes toward the inside of the perimeter of windshield glass 2. Furthermore, in the automotive window molding of the embodiment, the end face 30a of tip portion 30 of outside glass abutting portion 22 is formed or configured as a sloped surface that an angle α between the end face 30a and the outside surface 9 of windshield glass 2 is an obtuse angle. In the same manner as the end face 30a of tip portion 30 of outside glass abutting portion 22, the end face 32a of tip portion 32 of outside ornamental head portion 24 is also formed or configured as a sloped surface that an angle α between the end face 32a and the outside surface 9 of windshield glass 2 is an obtuse angle. Moreover, the outside ornamental head portion 24 is formed on its upper edge facing the vehicle-body panel 21 with a protruded portion 20b. The protruded portion 20b protrudes from the upper edge facing the vehicle-body panel (the front pillar) and is directed outside of the perimeter of windshield glass 2 so that the protruded portion 20b somewhat projects toward within the opening of the drain groove 18b. The protruded portion 20b is continuously formed throughout the overall length of side molding portion 4b. The protruded portion 20b of side molding portion 4b is also formed to be continuous with the protruded portion 20a of upper molding portion 4a. In the automotive window molding 4 having a cross-sectional structure as set forth above, during vehicle driving in the snow, snow is pressed against the side molding portion 4b by wiping action of a windshield wiper, and thus tends to enter the drain groove 18b and the drip groove 28.

Figure 4:
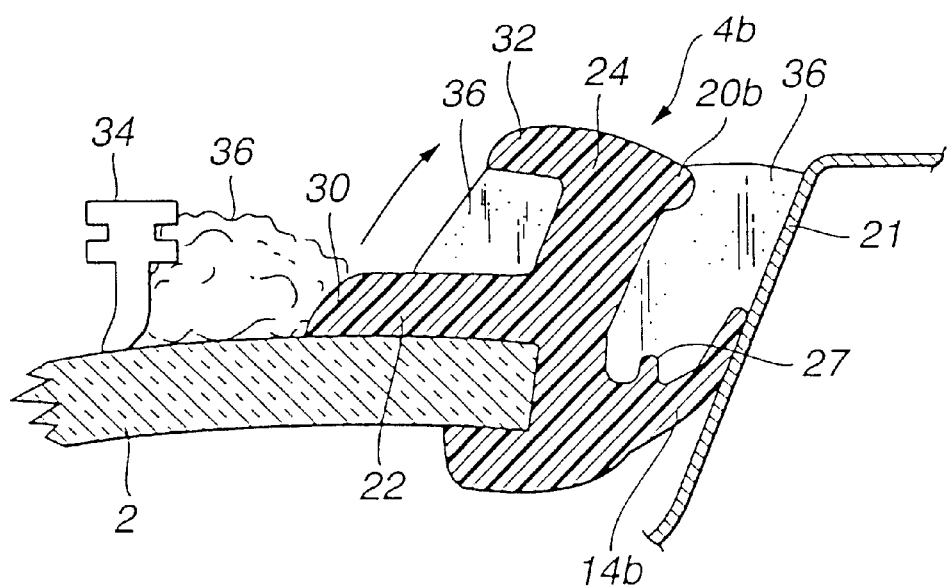
FIG. 4 is an enlarged cross-sectional view explaining the operation and effects of the automotive window molding (in particular, the side molding portion) of the invention in presence of the wiping action of the windshield wiper during vehicle driving in the snow.

Referring now to FIG. 4, there is shown the enlarged lateral cross section of the automotive window molding of the embodiment in the presence of the wiping action of a windshield wiper 34 during driving in the snow. As clearly seen in FIG. 4, snow 36 on the windshield glass 2 is moved towards the side molding portion 4b by way of the wiping action of wiper 34 and thus received by the side molding portion. At this time, part of snow 36 received by the side molding portion 4b impinges and is forces over the tip portion 30 of outside glass abutting portion 22, because the tip portion 30 of outside glass abutting portion 22 is configured to protrude toward the inside of the perimeter of windshield glass 2 more than the tip portion 32 of ornamental head portion 24 protrudes toward the inside of the perimeter of windshield glass 2. Part of snow impinged and forced over the tip portion 30 of the outside glass abutting portion 22 is jumped upward along the sloped end face 32a of tip portion 32 of ornamental head portion 24 and thus effectively removed every wiping action. This enhances snow-removing performance, and also prevents snow from being pressed together on the side molding portion 4b and strongly excessively adhered to it.

Figure 5:
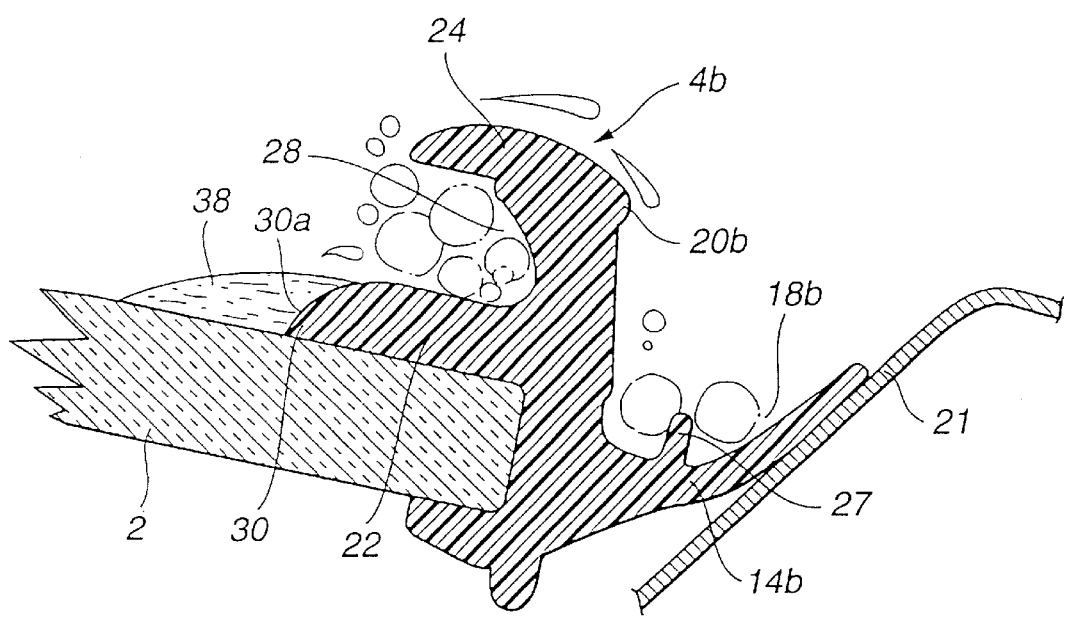
FIG. 5 is an enlarged cross-sectional view explaining the operation of the automotive window molding (in particular, the side molding portion) of the invention in presence of the wiping action of the windshield wiper during vehicle driving in the rain.

Referring to FIG. 5, there is shown the enlarged lateral cross section of the automotive window molding of the embodiment in the presence of the wiping action of the windshield wiper during driving in the rain. As clearly seen in FIG. 5, during the wiping action, rainwater 38 dripping on the windshield glass 2 is received by the end face 30a of tip portion 30 of outside glass abutting portion 22 of side molding portion 4b. Thereafter, rainwater 38 flows downwards along the end face 30a. As a result, rainwater is drained downward of the vehicle-body front pillar. Part of rainwater 38 going over the end face 30a is received or trapped by the drip groove 28, and then is drained downwards from the vehicle-body front pillar. Part of rainwater flowing within the drip groove 28 tends to flow along the outer surface of ornamental head portion 24 to the outside of the drip groove. Almost all of rainwater flowing along the outer surface of ornamental head portion 24 can be guided by the protruded portion 20b of ornamental head portion 24 and thus effectively cleared toward the outside of the vehicle. Part of rainwater 38 that is not cleared toward the outside of the vehicle can be received by the drain groove 18b, and then rainwater in the drain groove 18b can be efficiently drained downwards from the vehicle-body front pillar. At this time, the protruded portion 27 formed at the bottom of the drain groove 18b functions to divide the moisture content (rainwater in the drain groove 18b) into small water droplets, thus preventing water droplets in the drain groove 18b from developing into a large droplet size. Suppose water droplets in the drain groove 18b develop into a large droplet size. In such a case, owing to the water droplets developing into a large size, there is an increased tendency for a large amount of rainwater to momentarily overflow the drain groove 18b. Such undesirable overflow of the rainwater 38 from the drain groove 18b can be prevented by the provision of the protruded portion 27 formed at the bottom of the drain groove 18b. In other words, the protruded portion 27 contributes to smooth rainwater drainage. Also, in the same manner as the function of the protruded portion 20b of ornamental head portion 24 of side molding portion 4b, at the upper molding portion 4a almost all of rainwater flowing along the outer surface of outside head portion 10 can be guided by the protruded portion 20a of outside head portion 10 and thus effectively cleared toward outside of the vehicle. In the shown embodiment, the protruded portion 27 is formed in only the drain groove's side of side molding portion 4b. This reduces aerodynamic noise such as atmospheric wind flow noise around the wind molding during vehicle driving. The protruded portion 20a formed at the upper molding portion 4a and the protruded portion 20b formed at the side molding portion 4b each serves as an airflow straightener which controls or straightens or guides the airflow of atmospheric wind flowing from the windshield glass toward the vehicle-body roof and toward the A-pillars. Thus, the protruded portion 20a formed at the upper molding portion 4a and the protruded portion 20b formed at the side molding portion 4b effectively reduce the wind flow noise. In the automotive window molding of the embodiment, the protruded portion (20a, 20b) is formed throughout the overall length of the window molding 4, thus effectively suppressing undesirable wind flow noise which may occur around the drain grooves (18a, 18b) during vehicle driving.

In the shown embodiment, although the automotive window molding is exemplified in a windshield molding 4 attached onto a windshield glass (or a front window glass) 2, the fundamental concept of the invention may be applied to a rear window molding or to a back door window molding. In the automotive window molding of the embodiment, the end face 30a of tip portion 30 of outside glass abutting portion 22 and the end face 32a of tip portion 32 of ornamental head portion 24 each is configured as a sloped surface that an angle α between the end face and the outside surface 9 of windshield glass 2 is an obtuse angle. As a minimum requirement for the enhanced snow-removing performance as well as superior rainwater drainage performance, the tip portion 30 of outside glass abutting portion 22 has to be configured to protrude toward the inside of windshield glass 2 more than the tip portion 32 of ornamental head portion 24 protrudes toward the inside of windshield glass 2, however, the shape of the end face (30a, 32a) is not limited to the sloped surface. For example, the end face (30a, 32a) may be formed as a curved surface, or the tip portion may be semi-spherical in cross section.

The entire contents of Japanese Patent Application No. P11-360505 (filed Dec. 20, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive window molding attached onto a circumference of a window glass and arranged at a pillar side of a vehicle body, comprising:

a leg portion disposed between the circumference of the window glass and a vehicle-body panel;

an outside glass abutting portion being in contact with an outside surface of the window glass and arranged along the outside surface of the window glass to extend toward an inside of a perimeter of the window glass;

an inside glass abutting portion being in contact with an inside surface of the window glass and arranged along the inside surface of the window glass to extend toward the inside of the perimeter of the window glass;

a seal lip portion extending from an outer surface of the leg portion facing the vehicle-body panel and abutting at a tip thereof with the vehicle-body panel while being curved toward an outside of the vehicle body;

an outside ornamental head portion arranged outside of the outside glass abutting portion and spaced apart from the outside glass abutting portion so that the outside ornamental head portion and the outside glass abutting portion are opposed to each other;

a connecting wall portion interconnecting the outside ornamental head portion and the outside glass abutting portion; and a drip groove defined by the outside glass abutting portion, the outside ornamental head portion, and the connecting wall portion, so that the drip groove is opened toward the inside of the perimeter of the window glass;

wherein a tip portion of the outside glass abutting portion is configured to protrude toward the inside of the perimeter of the window glass more than a tip portion of the outside ornamental head portion protrudes toward the inside of the perimeter of the window glass, and which further comprises a drain groove formed between the leg portion and the vehicle-body panel by abutment of the seal lip portion with an outer surface of the vehicle-body panel in an outwardly-curved fashion so that the drain groove is opened toward the outside of the vehicle body, and a protruded portion formed at a bottom of the drain groove.

2. The automotive window molding as claimed in claim 1, further comprising a protruded portion formed on an edge of the outside ornamental head portion facing the vehicle-body panel and located outside of the perimeter of the window glass, and the protruded portion extending from the edge of the outside ornamental head portion toward the outside of the perimeter of the window glass.

3. An automotive window molding attached around a circumference of a windshield glass and having at least a side molding portion formed by extrusion molding and arranged at a pillar side of a vehicle body, comprising:

a leg portion disposed between the circumference of the windshield glass and a front pillar of the vehicle body;

an outside glass abutting portion being in contact with an outside surface of the windshield glass and arranged along the outside surface of the windshield glass to extend toward an inside of a perimeter of the windshield glass;

an inside glass abutting portion being in contact with an inside surface of the windshield glass and arranged along the inside surface of the windshield glass to extend toward the inside of the perimeter of the windshield glass;

a seal lip portion extending from an outer surface of the leg portion facing the front pillar and abutting at a tip thereof with the front pillar while being curved toward an outside of the vehicle body;

an outside ornamental head portion arranged outside of the outside glass abutting portion and spaced apart from the outside glass abutting portion so that the outside ornamental head portion and the outside glass abutting portion are opposed to each other;

a connecting wall portion interconnecting the outside ornamental head portion and the outside glass abutting portion, the connecting wall portion, the outside ornamental head portion, and the outside glass abutting portion being integrally formed with each other; and a drip groove defined by the outside glass abutting portion, the outside ornamental head portion, and the connecting wall portion, so that the drip groove is opened toward the inside of the perimeter of the windshield glass;

wherein a tip portion of the outside glass abutting portion is configured to protrude toward the inside of the perimeter of the windshield glass more than a tip portion of the outside ornamental head portion protrudes toward the inside of the perimeter of the windshield glass, and which further comprises a drain groove formed between the leg portion and the front pillar by abutment of the seal lip portion with an outer surface of the front pillar in an outwardly-curved fashion so that the drain groove is opened toward the outside of the vehicle body, and a protruded portion continuously formed at a bottom of the drain groove throughout an overall length of the side molding portion.

4. The automotive window molding as claimed in claim 3, further comprising a protruded portion continuously formed on an edge of the outside ornamental head portion, facing the front pillar and located outside of the perimeter of the window glass, throughout an overall length of the side molding portion, and the protruded portion extending from the edge of the outside ornamental head portion toward the outside of the perimeter of the windshield glass.

5. The automotive window molding as claimed in claim 3, wherein an end face of the tip portion of the outside glass abutting portion is formed as a sloped surface that an angle between the end face and the outside surface of the windshield glass is an obtuse angle.

6. The automotive window molding as claimed in claim 5, wherein an end face of the tip portion of the outside ornamental head portion is formed as a sloped surface that an angle between the end face and the outside surface of the windshield glass is an obtuse angle.

* * * * *